(12) United States Patent
Stumpf

(10) Patent No.: US 9,616,798 B2
(45) Date of Patent: Apr. 11, 2017

(54) PORTABLE FUEL STORAGE DEVICE

(71) Applicant: Fuelie Systems, Inc., Lewes, DE (US)

(72) Inventor: Thomas R. Stumpf, Chapel Hill, NC (US)

(73) Assignee: Fuelie Systems, Inc., Lewes, DE (US)

( * ) Notice: Subject to any disclaimer, the term of this patent is extended or adjusted under 35 U.S.C. 154(b) by 275 days.

(21) Appl. No.: 14/607,859

(22) Filed: Jan. 28, 2015

(65) Prior Publication Data

US 2016/0214789 A1   Jul. 28, 2016

(51) Int. Cl.
- *B62B 3/10* (2006.01)
- *B60P 3/22* (2006.01)
- *B67D 7/84* (2010.01)

(52) U.S. Cl.
CPC ............ *B60P 3/2205* (2013.01); *B62B 3/104* (2013.01); *B67D 7/845* (2013.01)

(58) Field of Classification Search
CPC ... B62B 3/10; B62B 3/104; B62B 9/18; F17C 13/04; F17C 13/084; F17C 13/085
USPC .................................. 280/79.11, 79.5, 47.41
See application file for complete search history.

(56) References Cited

U.S. PATENT DOCUMENTS

| | | | |
|---|---|---|---|
| 2,421,765 A | | 6/1947 | Taylor |
| 2,518,569 A | * | 8/1950 | Pierson ................ F17C 13/04 137/602 |
| 2,624,483 A | * | 1/1953 | Ketzel .................. B62B 3/104 248/129 |
| 2,667,397 A | * | 1/1954 | Hallisey ............... A61M 15/00 128/204.18 |
| 2,969,803 A | * | 1/1961 | Mosher ................ B64D 37/22 137/263 |
| 3,050,278 A | | 8/1962 | Gardner et al. |
| 4,168,007 A | * | 9/1979 | Rohatensky .......... B63C 11/02 211/85.18 |
| 4,802,515 A | * | 2/1989 | Pytryga ............... F17C 13/085 141/97 |
| 4,860,972 A | | 8/1989 | Lannerd et al. |
| 4,932,609 A | | 6/1990 | Secchiaroli et al. |

(Continued)

FOREIGN PATENT DOCUMENTS

| | | | | |
|---|---|---|---|---|
| CN | 201380749 Y | | 1/2010 | |
| FR | 2587019 A1 | * | 3/1987 | ............... B67D 1/14 |

(Continued)

OTHER PUBLICATIONS

Headquarters, Department of the Army. "Chapter 2. Section II—Refueling Equipment. Advanced Aviation Forward Area Refueling System." 4 pages. Army Techniques Publication for Forward Arming and Refueling Points. ATP 3-04.94. Jan. 2012. Accessed online at http://armypubs.army.mil/doctrine/dr_pubs/dr_a/pdf/atp3_04x94.pdf.

(Continued)

*Primary Examiner* — Joseph Rocca
*Assistant Examiner* — Daniel Yeagley
(74) *Attorney, Agent, or Firm* — Coats & Bennett, PLLC

(57) ABSTRACT

A portable storage device to contain fuel. The device is designed to be relatively light-weight to allow for movement around a fueling facility, and to be delivered to the fueling facility through the air. The device includes a number of separate tanks each configured to contain fuel. A suspension protects the tanks by absorbing external forces that could occur in the event the device is dropped during air delivery.

20 Claims, 10 Drawing Sheets

(56) References Cited

U.S. PATENT DOCUMENTS

| | | | | |
|---|---|---|---|---|
| 4,967,934 | A | * | 11/1990 | Andonian ............ F17C 13/085 137/266 |
| 5,242,032 | A | | 9/1993 | Prestwood et al. |
| 5,360,034 | A | | 11/1994 | Der Manuelian |
| 5,396,885 | A | * | 3/1995 | Nelson .................. A62B 25/00 128/204.18 |
| 5,570,895 | A | * | 11/1996 | McCue .................. B62B 1/264 280/47.19 |
| 5,893,398 | A | | 4/1999 | Garrett, Jr. |
| 6,059,127 | A | * | 5/2000 | Bennett .................... B62B 3/02 211/85.18 |
| 6,334,622 | B1 | * | 1/2002 | Romero .................. B62B 1/14 280/47.26 |
| 6,431,088 | B2 | | 8/2002 | Mahnken |
| 6,715,195 | B2 | | 4/2004 | Erickson |
| 6,792,966 | B2 | | 9/2004 | Harvey |
| 7,114,732 | B1 | * | 10/2006 | Ismail ..................... B23K 9/32 280/47.24 |
| 7,122,147 | B2 | * | 10/2006 | Wakeman ................ B23K 7/00 148/196 |
| 7,252,297 | B1 | * | 8/2007 | Barritt ..................... B23K 7/10 280/47.26 |
| 7,438,084 | B2 | * | 10/2008 | Trettin .................... B25H 3/00 137/355.16 |
| 7,484,521 | B2 | | 2/2009 | Kimbara et al. |
| 8,196,963 | B2 | | 6/2012 | Bachman |
| 8,579,332 | B2 | | 11/2013 | Sonderegger et al. |
| 8,668,178 | B2 | * | 3/2014 | Ziaylek ................ F17C 13/084 224/570 |
| 8,740,251 | B2 | | 6/2014 | Batson et al. |
| 8,919,476 | B2 | | 12/2014 | Holland et al. |
| 8,967,634 | B2 | * | 3/2015 | Barnes ................... B62B 1/142 280/43.11 |
| 9,061,822 | B2 | * | 6/2015 | Ness ...................... B65D 19/00 |
| 9,156,586 | B2 | * | 10/2015 | Girsh ..................... B65D 19/44 |
| D743,140 | S | * | 11/2015 | Muller ................... B62B 1/142 D34/38 |
| 2002/0084277 | A1 | * | 7/2002 | Mullens .................... F17C 3/08 220/560.04 |
| 2002/0109322 | A1 | * | 8/2002 | Bock ..................... B62B 5/0083 280/79.11 |
| 2003/0052466 | A1 | * | 3/2003 | Intravatola .............. B62B 1/264 280/79.6 |
| 2005/0184084 | A1 | * | 8/2005 | Wells ..................... B67D 7/348 222/1 |
| 2008/0112783 | A1 | * | 5/2008 | Bock ......................... B62B 1/14 414/349 |
| 2011/0240800 | A1 | * | 10/2011 | Fox, Jr. .................... B64D 1/14 244/138 R |
| 2012/0025027 | A1 | * | 2/2012 | Yandle ..................... B64D 1/14 244/137.1 |
| 2012/0199224 | A1 | | 8/2012 | Fagerhof |
| 2013/0181464 | A1 | * | 7/2013 | Ness ....................... B65D 19/02 294/68.1 |
| 2015/0329133 | A1 | * | 11/2015 | Glass ........................ B62B 1/14 280/47.26 |

FOREIGN PATENT DOCUMENTS

| | | |
|---|---|---|
| JP | 2005054949 A | 3/2005 |
| WO | 2008105721 A1 | 9/2008 |
| WO | 2013093544 A1 | 6/2013 |

OTHER PUBLICATIONS

Mobile Fueling Station. Product information sheet. 1 page. Viewed online Jun. 10, 2013, at http://dynafab.com/tank-mobile-fule-tanks.html. Dynafab Corp., Tomball, TX.

500 Gallon Mobile Fuel System. Product information sheet. 1 page. Viewed online Jun. 10, 2013, at http://www.fueltrailers.net/id71.html. L&J Services, Fruitland Park, FL.

EZ Mobile Fuelers. Product information sheet. 2 pages. Viewed online Jun. 10, 2013, at http://www.ezfuel.com/products/ez_mobile_fueler/. EZ Fuel & Tank Solutions, Duluth, GA.

Fuel Transport Tanks & Gas Caddies. 1 page. Viewed online Jun. 10, 2013, at http://www.tank-depot.com/browse.aspx?id=4. The Tank Depot, Pompano Beach, FL.

TransCube Vehicle and Equipment Fuel Trailers. Product information sheet. 3 pages. Viewed online Jun. 10, 2013, at http://www.qualityfueltrailers.com/fuel-trailer-types/vehicle-and-equipment-fuel-trailers/transcube-fuel-trailers. Quality Fuel Trailer & Tank, Inc. Petaluma, CA.

* cited by examiner

PORTABLE FUEL STORAGE DEVICE

BACKGROUND

The present application is directed to a portable fuel storage device and, more specifically, to a fuel storage device designed to be delivered by air.

Various fuel storage devices are known for supplying fuel to a desired location. One example includes a motorized vehicle with an attached fuel storage tank, such as a tanker truck. In use, the vehicle is loaded with fuel and then driven to the desired location where the fuel is dispensed. A similar example is a tank trailer that includes a fuel tank supported on a trailer platform and configured to be towed behind a vehicle. Another example is a fuel container sized to be handled by a user. The container includes an enclosed interior of usually less than 15 gallon fuel capacity and includes an exterior handle to facilitate movement. During use, the container is filled with fuel and then lifted and moved by the user to the desired location where fuel is dispensed. Each of these various types of fuel storage devices has limited application.

The motorized fuel vehicle and fuel trailer are limited to just locations where a vehicle can be driven. The fuel cannot be delivered to locations that are not accessible to the driven vehicle. Such locations may include rooftops, semi-enclosed structures, occupied structures, ships, and remote geographic positions (e.g., mountainous terrain, deserts). Likewise, the fuel container has limited applicability because it can only hold a limited amount of fuel because the user is limited by the amount of weight they are able to lift and move.

Existing fuel storage devices are also not designed for air delivery. These devices are not constructed to be readily lifted and delivered by an aircraft, such as a helicopter. Existing devices are also not equipped to prevent fuel leakage if handled roughly during delivery, which may occur during an air delivery.

SUMMARY

One embodiment is directed to a storage device to store and dispense fuel. The storage device includes a frame with a floor having a first side and an opposing second side. The frame also includes a central column that extends upward above the first side of the floor. A base is mounted to the frame below the floor. Wheels are mounted to the base. A master storage tank and slave tanks are positioned on the first side of the floor and extend around the central column. The storage tanks are spaced apart with an overall weight of the tanks when full of fuel being evenly distributed across the floor. One or more conduits extend between the master storage tank and the slave tanks to move the fuel from the slave tanks to the master tank. A suspension with resilient spacers is positioned between the frame and the base to provide relative motion between the base and the frame. The suspension also includes resilient spacers positioned between the tanks and the frame to provide relative motion between the tanks and the frame. A processing circuit is positioned within an interior of the central column to control the movement of fuel between the tanks.

The resilient spacers positioned between the frame and the base may be different than the resilient spacers positioned between the frame and the storage tanks.

The storage may also include an exterior casing mounted to the frame that forms an enclosed interior space over the floor with the storage tanks positioned within the interior space.

Another embodiment is directed to a storage device to store and dispense fuel. The storage device includes a frame with a floor and a column that extends outward above the floor. A wheeled base is mounted to the frame and positioned below the floor. Storage tanks are positioned on the floor and extend around the column with each of the storage tanks configured to contain fuel. One or more conduits extend between the storage tanks to move the fuel between the storage tanks. A retainer is mounted to the column and includes arms that extend radially outward from the column. Each of the arms are connected to one of the storage tanks to secure the storage tanks. The retainer is axially spaced along the column above the floor to connect to an upper portion of the storage tanks. A suspension with resilient spacers is positioned between the frame and the base to provide relative motion between the frame and the base. The suspension also includes resilient spacers positioned between the tanks and the frame to provide relative motion between the tanks and the frame. A processing circuit is positioned within an interior of the column to control the movement of fuel between the tanks.

Each of the first and second resilient spacers may be deformable between a first configuration when no external forces are acting on the tanks and a different second configuration when external forces are acting on the tanks.

The resilient spacers positioned between the tanks and the frame may be positioned between a bottom of the storage tanks and the floor of the frame.

The resilient spacers may be positioned between the retainer and the column to movably connect the retainer to the column.

Each of the storage tanks may be independently configured to contain the fuel.

Each of the storage tanks may include the same capacity.

A distal end of the column may be positioned a greater distance from the floor than each of the storage tanks.

The storage device may include an exterior casing attached to the frame that forms an enclosed interior space over the floor with the storage tanks positioned within the interior space.

The storage device may include support arms that extend between the column and the sidewall with the support arms forming receptacles spaced around the column that are each sized to contain one of the storage tanks.

The resilient spacers positioned between the frame and the base may be separate from and spaced away from the resilient spacers positioned between the tanks and the frame.

Another embodiment is directed to a storage device to store and dispense fuel. The storage device includes a frame with a floor with a first side and an opposing second side. A sidewall is positioned around the floor and extends upward above the first side of the floor. A column at the center of the frame extends upward above the first side of the floor. A base is mounted below the floor, and wheels are mounted to the base. A master storage tank and slave tanks are positioned on the first side of the floor and within the sidewall. The storage tanks are spaced apart along the floor with an overall weight of the tanks when full of the fuel being evenly distributed across the floor. One or more conduits extend between the master storage tank and the slave tanks to move the fuel from the slave tanks to the master tank. One or more first resilient spacers are positioned between the tanks and the frame to provide relative movement between the tanks and the frame. One or more second resilient spacers are positioned between the frame and the base to provide relative movement between the frame and the base. The one or more second resilient spacers are separate from and spaced away from the one or more first resilient spacers. Each of the first and second resilient spacers are deformable between a first configuration when no external forces are acting on the tanks and a different second configuration when external forces are acting on the tanks.

A distal end of the central column opposite from the floor may be positioned above the storage tanks.

The first and second resilient spacers may be each constructed from an elastic material.

The storage device may also include an exterior casing attached to the frame that forms an enclosed interior space over the floor with the storage tanks positioned within the interior space.

A distal end of the column may extend outward from the exterior casing.

The one or more conduits may extend through the floor of the frame with a first section positioned on the first side of the floor and a second section positioned on the second side of the floor.

The storage device may also include support arms that extend between the column and the sidewall with the support arms forming receptacles spaced around the central column that are each sized to contain one of the storage tanks.

The various aspects of the various embodiments may be used alone or in any combination, as is desired.

DETAILED DESCRIPTION

The present application is directed to portable fuel storage device. The device is designed to be relatively light-weight to allow for movement around a fueling facility. The device is also designed to be highly durable and to be delivered to the fueling facility through the air. The device is designed to store fuel in a number of separate tanks and to protect the tanks through a chassis system with a suspension that absorbs external forces and impacts that could occur during air delivery.

Figure 1:
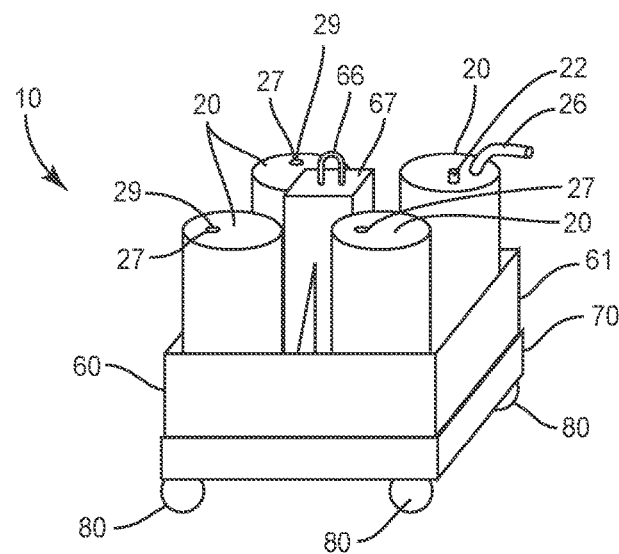
FIG. 1 is a perspective view of storage tanks, a frame, and a base of a device.

FIG. 1 illustrates a fuel storage device 10. Device 10 includes separate fuel tanks 20 each configured to hold fuel. The fuel tanks 20 are positioned in a frame 60 and supported on a base 70. An external frame suspension (not illustrated in FIG. 1) is positioned between the frame 60 and base 70 to absorb forces that are applied to the device 10. Further, an internal tank suspension (not illustrated in FIG. 1) is positioned between the individual tanks 20 and one or more sections of the frame 60 to absorb the forces that may occur when the device 10 is being delivered through the air. To facilitate air delivery, the frame 60 includes a central column 67 that includes a connector 66 for attachment with an aircraft, as well as wheels 80 for movement at the fueling facility.

The device 10 is designed to be filled with fuel and air delivered to a desired location. The device 10 is designed for connection with and lifting by an aircraft. The device 10 is particularly applicable for use with a helicopter, although the device 10 may also be moved by other types of aircraft. The device 10 is further relatively small to facilitate air delivery. In one embodiment, the dimensions of the device 10 are about 38 inches wide by 38 inches long by 44 inches tall. The device 10 is further relatively light, with one embodiment configured to hold a total of about 120 gallons of aviation fuel. This embodiment has a weight of about 250 lbs. when empty and a weight of about 1000 lbs. when the tanks 20 are full of fuel.

The ability of the device 10 to be transported via air makes it ideal for use in establishing a remote fueling depot. The fuel device 10 can be positioned at a variety of different geographic positions thus forming a fueling depot for any engine or turbine powered equipment including trucks, cars, helicopters, airplanes, and drone aircraft. In one embodiment, the device 10 can be delivered to helipads, such as those on the tops of buildings. One specific embodiment is use of the device 10 at hospital helipads. Through the use of the device 10, helicopters can continue to use the helipads in the same manner as previously, and in addition, can refuel without returning to their airport thus providing additional air coverage and increasing the aircrafts functional geographic envelope.

Further, the device 10 is relatively small and easy to move at the facility. In most instances, the device 10 can be moved by a single person on improved surfaces. This provides for the device 10 to be moved out to the landing pad as needed, and then moved to a storage facility in proximity to the landing pad when not in use.

Figure 2:
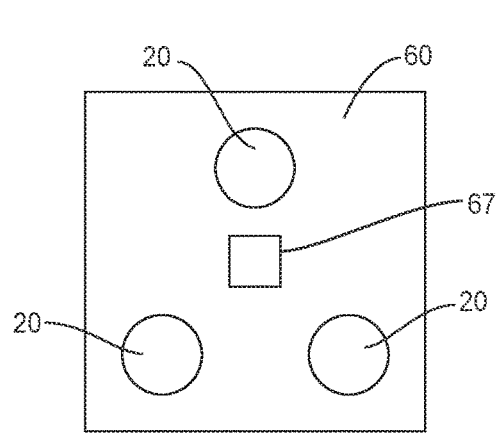
FIG. 2 is a top schematic view of tanks positioned on a floor of a frame of a device.
Figure 3:
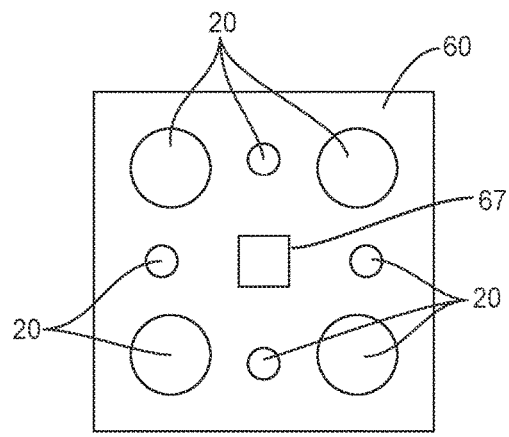
FIG. 3 is a top schematic view of tanks positioned on a floor of a frame of a device.
Figure 4:
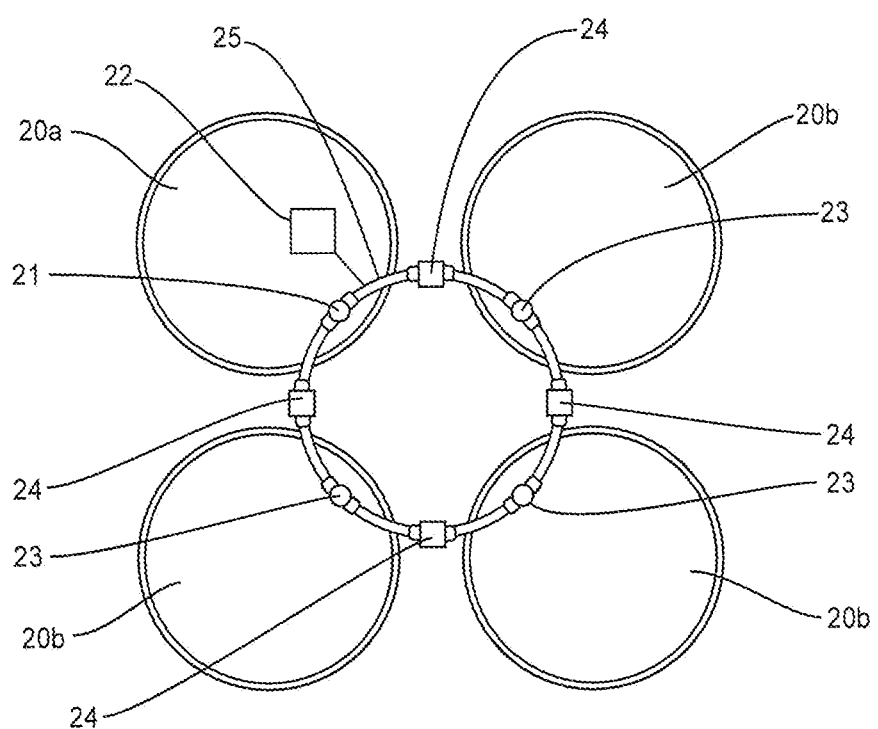
FIG. 4 is a bottom schematic view of tanks and a fuel distribution system for moving the fuel within the tanks.

The device 10 may include various numbers of storage tanks 20. Each of the storage tanks 20 includes an enclosed interior to hold the fuel. The number and size of the tanks 20 may vary. Examples include but are not limited to a device with four storage tanks 20 (FIGS. 1 and 4), three storage tanks 20 (FIG. 2), and eight storage tanks 20 (FIG. 3). The various tanks 20 may have the same fuel capacity, or may include different fuel capacities. FIGS. 1, 2 and 4 include storage tanks 20 of equal storage capacities. FIG. 3 includes four larger capacity tanks 20 and four smaller capacity tanks 20.

The storage tanks 20 are positioned about a frame 60 to evenly distribute the weight. The even weight distribution facilitates transport by air and prevents tipping of the device 10. When a single connector 66 at a center of the frame 60 is used to lift the device 10, the tanks 20 are distributed about the frame 60 to keep the device 10 level. In one embodiment, each of the tanks 20 includes a cylindrical shape and each of the tanks is the same size.

The tanks 20 include a master tank 20a and one or more slave tanks 20b that are interconnected through a fuel distribution system as illustrated in FIG. 4. For purposes of clarity, the tanks as a whole will be referred to and denoted as element number 20. Specific reference to a master tank will be denoted as element 20a and specific reference to a slave tank as element 20b.

The fuel distribution system includes one or more conduits 25 that extend between the tanks 20. FIG. 4 includes a single conduit 25 that extends between each of the tanks 20. Other embodiments may include dedicated conduits 25 that extend between one of the slave tanks 20b and the master tank 20a. In the various embodiments, the one or more conduits 25 include an outlet 23 in the slave tanks 20b and an inlet 21 in the master tank 20a to move the fuel from the slave tanks 20b to the master tank 20a. The fuel distribution system may also include one or more pumps 22 to move the fuel between the various tanks 20. The fuel distribution system may also include one or more solenoid valves 24 to control the flow of the fuel between the various tanks 20. The solenoid valves 24 are positioned along the fuel line and configured to be selectively opened and closed to control the flow of fuel between the tanks 20. The conduit 25 may be positioned above and/or below a floor 62 of the frame 60.

As illustrated in FIG. 1, each of the tanks 20 may also include one or more ports 27. The ports 27 may be used to input fuel into the tanks 20 to fill the device 10. In one embodiment, filling is accomplished by delivering fuel into each of the tanks 20. In another embodiment, fuel is delivered to just one or more of the tanks 20. The fuel distribution system through a control circuit 50 then delivers the fuel between the tanks 20. The ports 27 may be positioned on a top of the tanks 20 to provide access to fill the tanks and reduce or eliminate potential leaking.

One or more of the tanks 20 may also be treated to prevent leaking and/or prevent explosions or fires in the event the tank 20 is pierced. The interior of one or more of the tanks 20 include reticulated foam that is a very porous, low density solid foam. The solid component of the foam may include an organic polymer, such as polyurethane, a ceramic, or a metal. The exterior of one or more of the tanks 20 may include a urethane-based coating. The coating includes a "self-healing" property to fill and seal a hole in the event that the tank 20 is pierced. The interior and/or exterior materials are particularly effective when the device 10 is used in a combat environment.

A hose 26 may be attached to the port 27 of the master tank 20a. The hose 26 provides for delivering fuel from the device 10. The hose 26 may include a variety of different lengths. A nozzle with an actuator switch may be attached to the end of the hose 26 to further facilitate fuel delivery. The hose 26 may also include a separate fuel pump for pumping the fuel from the master tank 20a for delivery through the hose 26.

The hose 26 may be fixedly attached to the port 27 of the master tank 20a. The hose 26 remains attached at the port 27 during both use and non-use times. Alternatively, the hose 26 may be removably attached to the port 27. The removable hose 26 may be stored with the device 10 and installed as needed. Alternatively, users of the device 10 may be equipped with a hose 26 for use upon arriving at the device 10. In one embodiment, the removable hose 26 is equipped with a fuel pump. The removable hose 26 may also be equipped with a filtration system. During installation of the hose to the port 27, the hose 26 is operatively connected to a control circuit 50 in the device 10. This connection may be via hardwire or may be via wireless communication protocols. In one specific embodiment, the fuel pump 22 includes a wire and plug that is connected to a watertight dedicated electrical receptacle on the column 67 during use.

Pressure relief valves 29 are configured to mount to the tanks 20. The valves 29 equalize pressures between the interior of the tanks 20 and the exterior environment. The valves 29 are configured to equalize both positive and negative pressure differentials. The valves also allow for minimal ambient air to enter into the tanks 20 which allows for equal tank draw-down when pumping fuel. Pressure relief valves 29 may be mounted on any number of the tanks 20. The valves 29 may be configured to be removably mounted to the ports 27, such as being threaded to engage with corresponding threads at the ports 27. This allows for the valves 29 to be mounted to the tanks 20 at certain times, such as during air delivery, and removed as necessary such as during refueling. Valves 29 may also be permanently attached to the tanks 20 away from the ports 27.

The flow of fuel through the device 10 is controlled by the control circuit 50. The control circuit 50 may be positioned within the central column 67. This may include each of the various components positioned within the central column 67. In other embodiments, one or more of the components is positioned outside of the central column 67.

Figure 5:
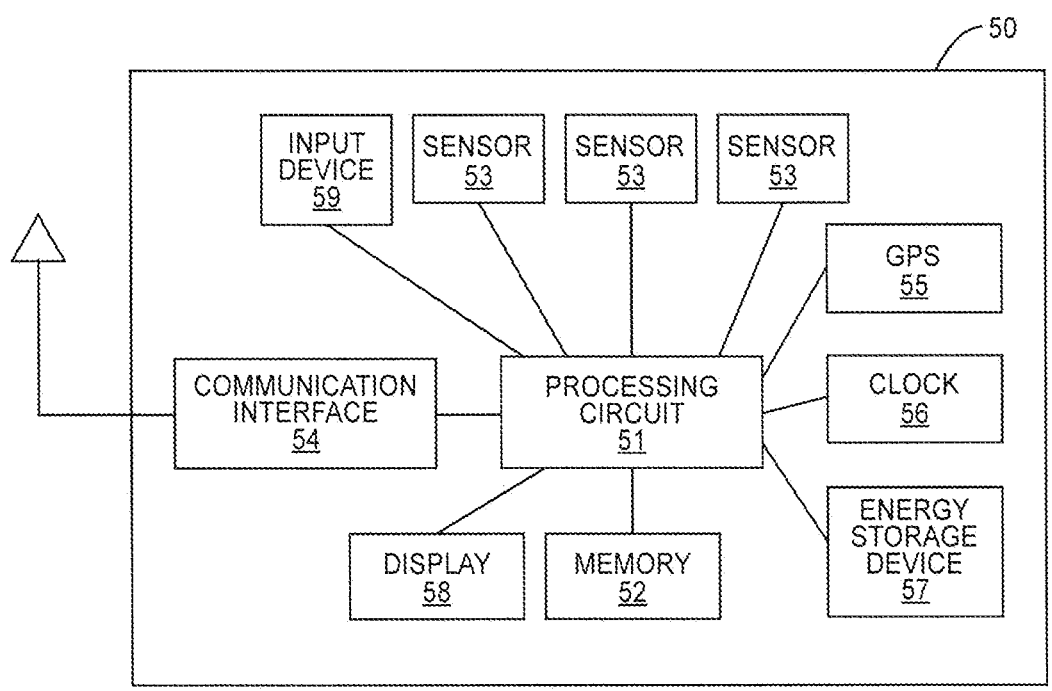
FIG. 5 is a schematic diagram of a control circuit.

The control circuit 50 controls the various components of the fuel delivery system. As illustrated in FIG. 5, the circuit 50 includes a processing circuit 51, including, for example, one or more microprocessors, microcontrollers, Application Specific Integrated Circuits (ASICs) or the like, configured with appropriate software and/or firmware to control the overall operation of the device 10 according to program instructions stored in a memory circuit 52. The processing circuit 51 is configured to perform calculations to determine various aspects such as but not limited to a remaining amount of fuel in each of the tanks 20 based on one or more signals received from one or more sensors 53, the amount of fuel dispensed during a dispensing operation, and an initial amount of fuel stored in the device 10.

The control circuit 50 includes a computer-readable storage medium (shown as memory circuit 52), which stores instructions and/or data needed for operation. The memory circuit 52 may include both volatile and non-volatile memory, for example.

The control circuit 50 may include one or more different sensors 53 to detect an amount of fuel within the tanks 20. In one embodiment, each tank 20 is equipped with a separate sensor 53. One or more sensors 53 may be positioned within the fuel delivery system to determine the amount of remaining fuel and/or fuel flow between the tanks 20 and/or the flow of fuel being dispensed through the hose 26. Various types of sensors 53 may be used to determine the remaining fuel and fuel flow. Examples include but are not limited to weight sensors, volume sensors, and pressure sensors. Various other sensors 53 may also be included to sense various environmental aspects or positional aspects of the device 10, such as but not limited to interior and exterior temperature sensors, orientation sensors, motion sensors, humidity sensors, wind speed sensors, wind direction sensors, fuel temperature sensors, voltage sensor, and ammeter current sensor. Sensors 53 may also include aspects about the delivery of the device 10, such as impact sensors. Sensors 53 may also provide surveillance information, such as proximity sensors and ground vibration sensors.

FIG. 5 includes the one or more sensors 53 included within the control circuit 50. Other embodiments may include one or more of the sensors as separate components that are communicatively coupled to the processing circuit 51.

A communication interface 54 may comprise a short-range wireless interface, such as a BLUETOOTH interface, RFID, ZIGBEE, or WIFI interface, and a long range cellular phone or satellite communications interface. There may be more than one communications interface 54. Communication interface 54 may also include an antenna configured for transmitting and receiving wireless signals to and from remote sources (e.g. a home base, aircraft).

The control circuit 50 may include a GPS receiver 55 or other location detector to determine the location of the device 10. A clock 56 may be associated with the control circuit 50 that measures the various timing requirements for specific events. The clock 56 may be independent from the processing circuit 51 as illustrated in FIG. 5, or may be incorporated within the processing circuit 51.

An energy storage device 57 (e.g., a battery) is provided to power the various components of the control circuit 50. In one embodiment, the energy storage device 57 is a rechargeable battery that can be recharged through a photovoltaic module that includes one or more solar panels mounted on the exterior of the device 10. The photovoltaic module is configured to generate and supply electricity for recharging the energy storage device 57. The storage device 57 may also be recharged through a utility line powered charger.

A display 58 may be configured to display information to a user. The display 58 may comprise a liquid crystal display (LCD) or an organic light emitting diode (OLED) for example. An input 59 may provide for a user to enter applicable information. The input 59 may include a variety of formats, including but not limited to one or more buttons, touchpad, and keypad.

The control circuit 50 is configured to monitor and control the flow of fuel in the device 10. The control circuit 50 monitors the amount of fuel in each tank 20 through readings from the one or more sensors 53. The control circuit 50 further controls the distribution of fuel about the tanks 20 to maintain an even distribution of weight when fuel is being dispensed through the master tank 20a. Control circuit 50 controls the fuel distribution to move fuel from the slave tanks 20b into the master tank 20a to maintain the even weight distribution for the device 10. The control circuit 50 may cause the fuel to be distributed throughout the tanks 20 as fuel is being dispensed from the master tank 20a. Alternatively, the fuel may be initially removed from the master tank 20a, and at some later time replenished from the slave tanks 20b.

Control circuit 50 also monitors the amount of fuel in the device 10. This may include a total amount of fuel in the device 10 as well as the amount of fuel in each individual tank 20.

The control circuit 50 may also be configured to isolate one or more of the tanks 20 in the event of a leak. Control circuit 50 monitors the amount of fuel in each tank and the amount of fuel added into the device 10 and dispensed from the device 10. In the event sensor readings indicate that fuel is leaking from one or more tanks 20, control circuit 50 may pump the remaining fuel from the one or more leaking tanks 20 and into the other operational tanks 20. After the fuel has been removed from the leaking tanks, one or more of the solenoid valves 24 in the fuel distribution system may be activated to shut the fuel line thus isolating the leaking tank(s). Further, control circuit 50 may redistribute the fuel in the operational tanks 20 to distribute the weight evenly about the device 10. In one embodiment, this includes emptying an operational tank that is positioned opposite from a leaking tank to evenly distribute fuel.

The control circuit 50 is further configured for the device 10 to dispense fuel in the event the master tank 20a becomes inoperative such as by being damaged or beginning to leak. The control circuit 50 may pump the fuel from the master tank 20a into one or more of the slave tanks 20b. Once removed, the master tank 20a is isolated from the system by shutting off one or more of the solenoid valves 24. One of the operative slave tanks 20b is selected as the new master tank 20a. The delivery hose 26 is configured to connect with the fuel port 27 of the new master tank 20a. Control circuit 50 operates the device to dispense the remaining fuel through the new master tank 20a in the same manner.

The control circuit 50 may be configured to be locked-out when not in use. This prevents an unwanted party from using the device 10 to dispense fuel. The control circuit 50 may be activated by one or more commands that are received either remotely through the communication interface 54 (such as from an approaching aircraft or a home base). Activation may also occur through the input device 59 which is positioned on the exterior of the device 10. A user at the input device 59 may input the required commands to activate the device 10.

Control circuit 50 is further configured to transmit the fuel information and/or operational state of the device 10 to a remote location, such as a home base or to various aircraft. This may include periodic signal transmissions (e.g., daily, hourly, weekly) regarding these aspects of the device. This may also transmit this information in response to an incoming request, such as from an aircraft seeking fuel.

Figure 6:
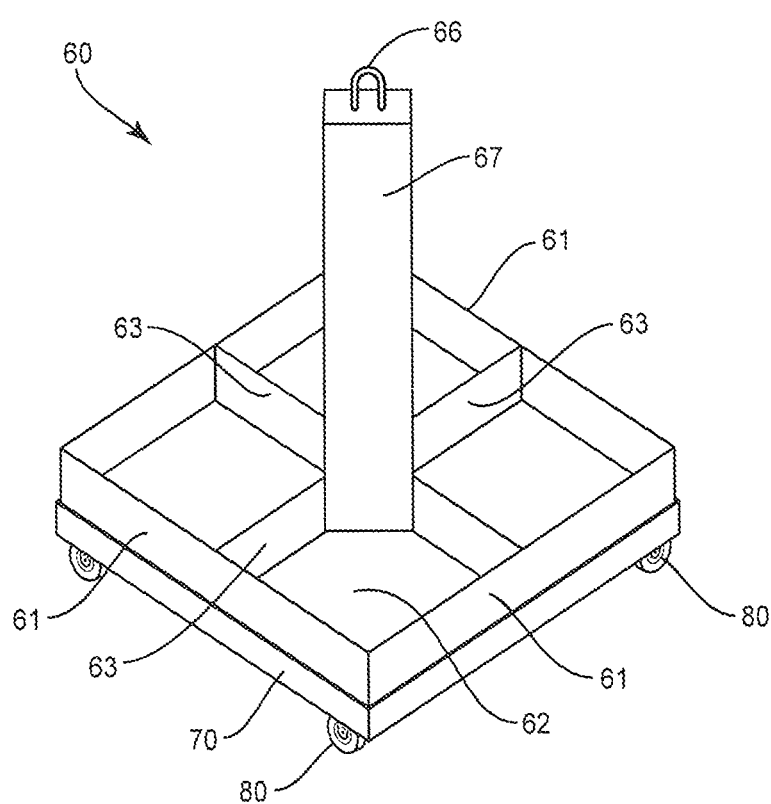
FIG. 6 is a perspective view of a frame and base of a device.
Figure 7:
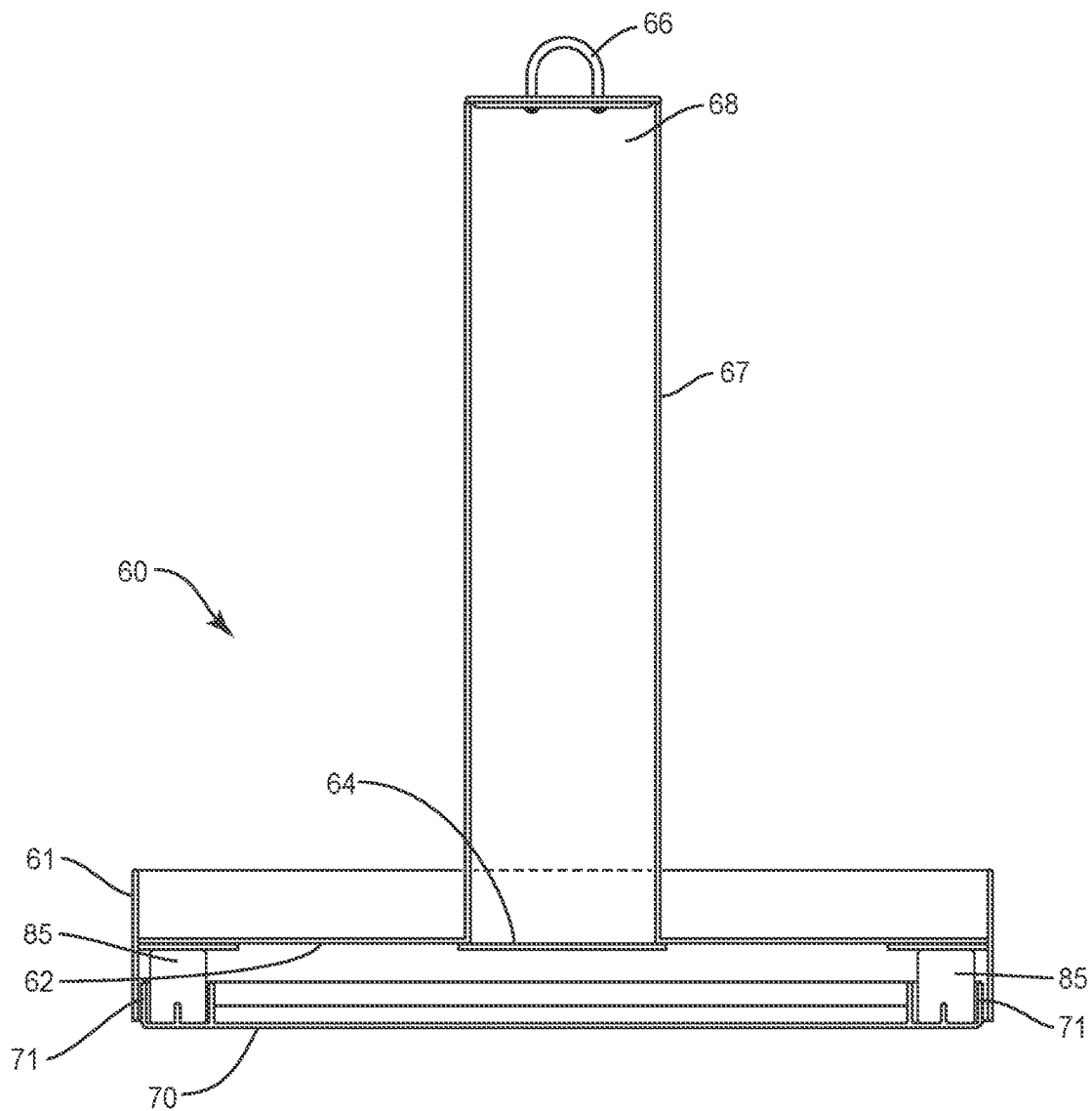
FIG. 7 is a schematic cut-away side view of a frame, resilient spacers, and base of a device.

FIG. 6 illustrates a perspective view of the frame 60 and base 70 with the tanks 20 removed for clarity. FIG. 7 includes a side view of a frame 60 and base 70 with a portion of the frame 60 and base 70 removed for viewing the interior. The frame 60 is configured to receive the tanks 20. The frame 60 includes a floor 62 on which the tanks 20 are positioned, and a sidewall 61 that extends upward from the floor 62 around the periphery. The floor 62 and sidewall 61 form a reservoir to capture fuel that may leak from the tanks 20. The height of the sidewall 61 and thus the holding capacity of the reservoir may vary. In one embodiment, sidewall 61 is sized such that the reservoir can contain the fuel from one of the tanks 20.

The column 67 extends upward above the floor 62 and includes an enclosed interior space 68 sized to contain a portion or entirety of the control circuit 50. The connector 66 is mounted at the exposed end of the column 67. The connector 66 is sized and shaped to be connected to an aircraft for air delivery. The height of the column 67 may vary, although it should include a greater height than the tanks 20. This greater height positions the connector 66 above the tanks 20 to facilitate attachment with the aircraft and prevent or reduce contact between the aircraft and/or tanks 20 and a lifting cable during air transport.

The column 67 may be positioned at a center of the frame 60 which may include positioning at the center of the floor 62. The central column 67 and tank distribution around the column 67 evenly distributes the weight of the device 10. When the device 10 is lifted at a single point through the connector 66 at the end of the column 67, this weight distribution causes the device 10 to be level such that the tanks 20 are supported by the floor 62. The level positioning prevents shifting of the tanks 20 about the floor 62. Further, the central location and positioning within the tanks 20 provides additional protection to the control circuit 50. As illustrated in FIG. 1, the tanks 20 and sidewall 61 shield the column 67 and interior control circuit 50. When used in certain settings, the tanks 20 and sidewall 61 may stop a projectile from damaging the control circuit 50.

The column 67 may also be positioned offset from a center of the frame 60. The tanks 20 are distributed about the floor 62 and relative to the column 67 to distribute the weight for the device 10 to remain level when lifted through the connector 66 at the end of the column 67.

Figure 8:
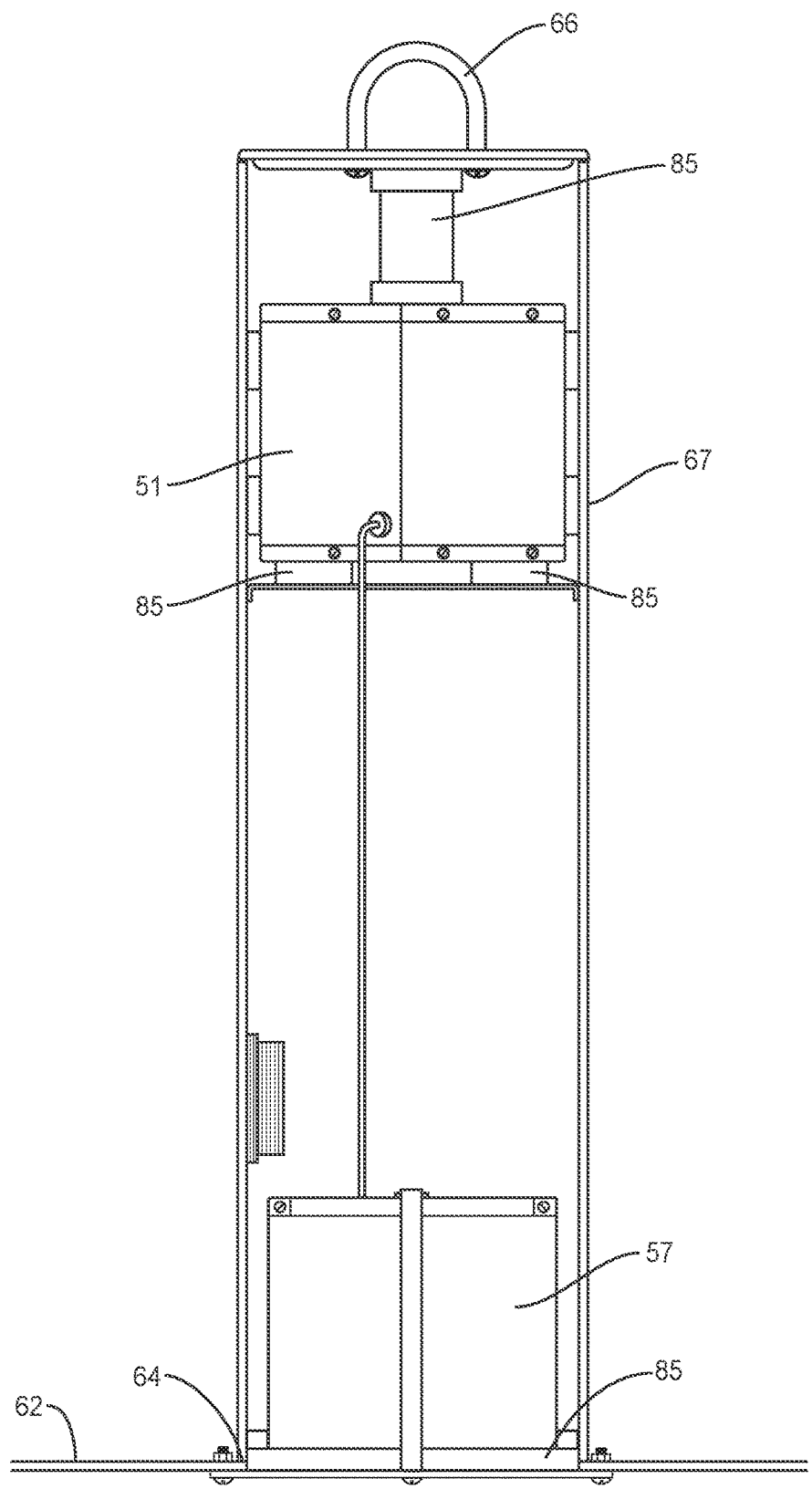
FIG. 8 is a schematic cut-away side view of a control circuit positioned within an interior of a column.

FIG. 8 illustrates the processing circuit 51 of the control circuit 50 positioned within the interior of the column 67. The energy storage device 57 may be positioned in a lower section of the column 67, such as at an opening 64 in the floor 62. This facilitates access to the energy storage device 57 during service and replacement. One or more of the components may be positioned outside of the column 67, such as the sensors 53, display 58, and input device 59. These components may be operatively connected to the processing circuit 51 via a hardwire connection or wirelessly.

Device 10 may also include one or more exterior power receptacles that are connected to the energy storage device 57. The receptacles provide for the input of utility power to operate one or more of the device components, such as the battery charger, power inverter, fuel distribution system and control circuit 50 in the event of failure of the energy storage device 57.

The frame 60 also includes support arms 63 that extend between the column 67 and the sidewall 61 at various points around the frame 60. In one embodiment, the column 67 includes a rectangular cross-sectional shape and the support arms 63 extend outward from each of the corners. The arms 63 may also divide the frame 60 into different sections that are each sized to receive one of the tanks 20. The arms 63 prevent the tanks 20 from sliding around on the floor 62 of the frame 60 when the device 10 is being transported.

The support arms 63 are designed to deform and absorb an exterior force that is applied to the device 10. Under extreme circumstances, such as the tanks 20 being fully loaded with fuel and dropped from a height in excess of 10 feet, the frame 60, base 70, support arms 63, and sidewall 61 are designed to mechanically deform and absorb additional force before the tanks 20 deform and fail from impacted hydraulic force.

The base 70 is positioned below the frame 60. The base 70 is sized to support the frame 60, and generally has the same size and shape as the floor 62. As illustrated in FIG. 7, one or more receptacles 71 face upwards towards the frame 60. The receptacles 71 may extend around the periphery of the base 70. The sides of the frame 60 and base 70 may overlap to provide protection to interior elements. Wheels 80 are attached to the base 70 for moving the device 10 once delivered to the desired location. The number and size of the wheels 80 may vary depending upon the type of use.

The frame 60 and base 70 may be constructed from a variety of different materials. Examples include but are not limited to steel, aluminum, engineer-grade polymers, glass, aramid, Kevlar, and carbon fiber/resin composites. The components of the frame 60 and base 70 may be constructed from the same or different materials.

Figure 13:
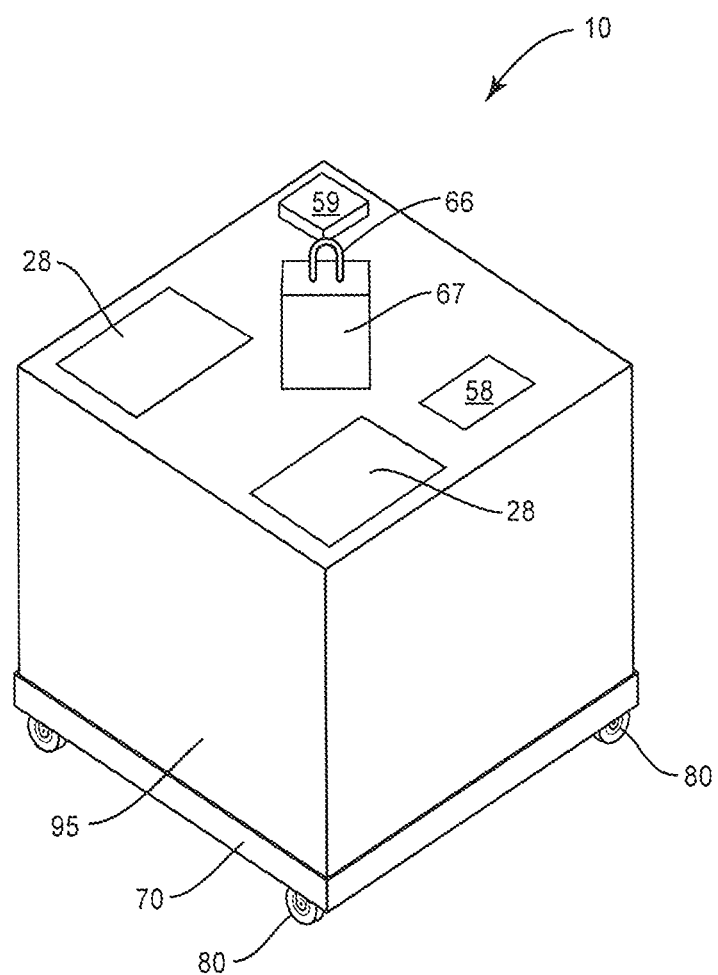
FIG. 13 is a perspective view of a device.

A casing 95 as illustrated in FIG. 13 may extend over the tanks 20 and the frame 60 to provide protection and additional structural support. The casing 95 may be mechanically connected with both sealing adhesives and/or fasteners to the frame 60 around the exterior of the sidewall 61, and to the central column 67. This creates a sealed and integrated semi-monocoque structure. Exterior forces such as impacts on the frame 60, base 70 or casing 95 are transferred through both the frame 60 and casing 95 and the energy is distributed into the suspension.

In one embodiment, the casing 95 is sealed to the frame 60 forming a liquid-tight interior space that houses the tanks 20. Fuel that leaks from one or more of tanks 20 is contained within this interior space, even if the fuel that accumulates on the floor 62 extends above the sidewall 61.

The casing 95 extends around a majority of the device 10. As illustrated in FIG. 13, the casing 95 is sized such that just the distal end of the column 67 and a limited section of the base 70 are exposed. The tanks 20, control circuit 50, and fuel distribution system are positioned within and protected by the casing 95. The casing 95 also prevents or eliminates tampering when the device 10 is placed out in the field.

The casing 95 may include one or more access doors 28 (see FIG. 13) to access the interior space. As illustrated in FIG. 13, the access doors 28 may be positioned to access the tops of the fuel tanks 20, such as during refueling of the tanks 20 or dispensing fuel from the master tank 20*a*.

The casing 95 may be constructed from a variety of materials, including but not limited to aluminum alloy, steel alloy, high density polyethylene, polymer, glass fiber, aramid fiber, carbon fiber, Kevlar fiber and resin composites, ceramic composites, and combinations thereof. In one specific embodiment, the casing 95 is constructed from Kevlar and blow-molded high-density polyethylene (HDPE).

The device 10 includes a suspension to protect the tanks 20. The suspension includes an internal suspension to allow relative movement between the tanks 20 and frame 60 and an external suspension to allow relative movement between the frame 60 and base 70.

Figure 9:
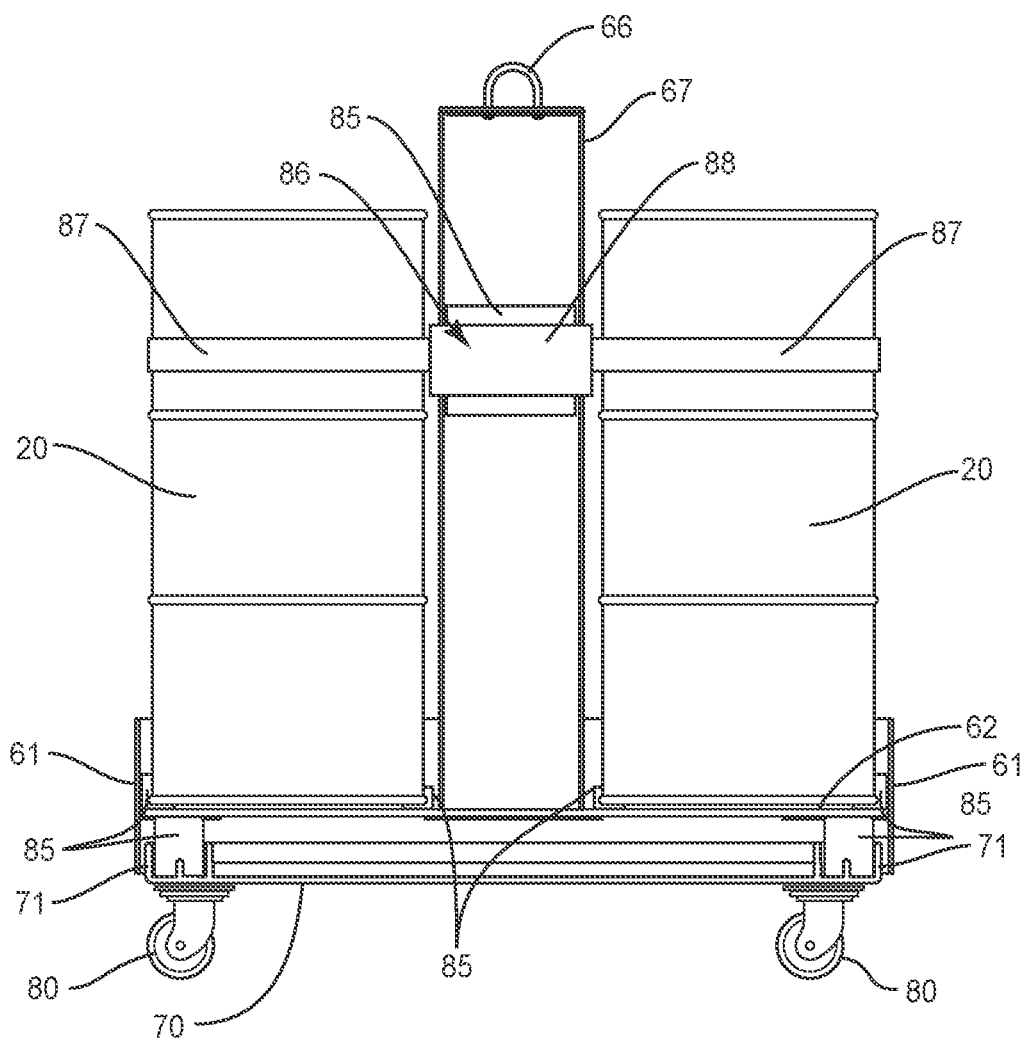
FIG. 9 is a schematic side view with portions of the lower frame and base cut away illustrating tanks, a frame, a base, and resilient spacers of a suspension.
Figure 10:
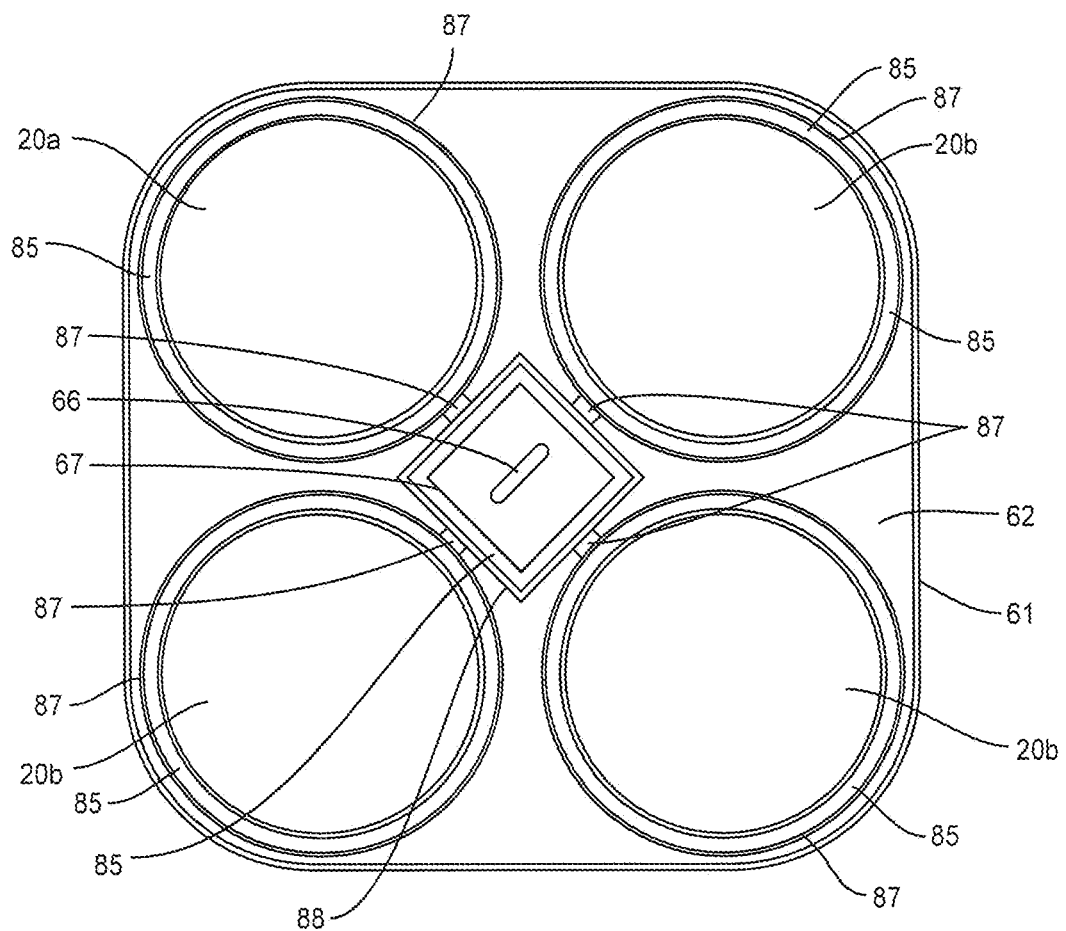
FIG. 10 is a top view of a device.

The internal suspension allows for relative movement between the tanks 20 and the frame 60. As illustrated in FIG. 9, resilient spacers 85 are positioned between the tanks 20 and the floor 62. The resilient spacers 85 may extend around the entirety of each of the tanks 20 as illustrated in FIG. 10, or may extend around limited sections of the tanks 20. Dampers 85 may also extend between the sidewall 61 and the tanks 20.

A retainer 86 attaches the tanks 20 to the column 67 as illustrated in FIGS. 9 and 10. The retainer 86 includes arms 87 that extend between the column 67 and the tanks 20. The arms 87 may extend completely around the perimeter of the tanks 20, or may extend around a limited length of the perimeter. The arms 87 may be directly connected to the column 67, such as through mechanical fasteners or otherwise joined to the column 67 such as through welding. The retainer 86 may also include a sleeve 88 that extends around and is connected to the column 67. The arms 87 are connected to the sleeve 88.

FIGS. 9 and 10 include the retainer 86 having a sleeve 88 that extends around the column 67. Arms 87 extend from the sleeve 88 and extend completely around the perimeter of the tanks 20. Resilient spacers 85 are positioned between the arms 87 and the tanks 20 to provide for movement of the tanks 20 relative to the arms 87 and the column 67. Resilient spacers 85 are also positioned between the sleeve 88 and the column 67. Again, this provides for relative movement between the tanks 20 and the column 67. In one embodiment, resilient spacers 85 are just positioned between the column 67 and the sleeve 88. The one or more resilient spacers 85 provide for movement of the tanks 20 relative to the frame 60. This movement dissipates forces that act on the tanks 20 in the event the device 10 is dropped during transport.

The retainer 86 is positioned along an upper half of the height of the tanks 20. In one embodiment as illustrated in FIG. 9, the retainer 86 is positioned along the upper quarter of the height of the tanks 20. The retainer 86 secures the tanks 20 to the column 67 and prevents tipping of the tanks 20. The resilient spacers 85 and retainer 86 provide for some movement between the tanks 20 and the frame 60, while supporting the tanks 20 in the upright position without tipping.

The external suspension allows for relative movement between the frame 60 and base 70. The external suspension includes one or more resilient spacers 85 positioned between the frame 60 and the base 70. In one embodiment, the one or more resilient spacers 85 extend between and space apart the frame 60 and base 70. The resilient spacers 85 may be connected to one or both of the frame 60 and base 70. FIGS. 7 and 9 include the resilient spacers 85 positioned within the receptacle 71 in the base 70. The suspension extends outward from the base 70 and contacts against and supports the frame 60.

The number and size of the resilient spacers 85 may vary. In one embodiment, the resilient spacers 85 extend completely around the perimeter of the base 70. The resilient spacer 85 may also be positioned at one or more discrete locations between the frame 60 and base 70.

The resilient spacers 85 are constructed to provide for relative movement between the frame 60 and base 70 when a force is applied to the device 10. In one embodiment, the resilient spacers 85 allow for the frame 60 and base 70 to move together but prevent contact. The resilient spacers 85 dissipate forces that act on the device 10 thus protecting the tanks 20.

The various resilient spacers 85 may include a variety of different devices and materials. Examples include but are not limited to springs, shock absorbers, linkages, viscoelastic materials, elastomers, rubber, and polyurethane. In one embodiment, the spacers 85 are formed by an elastomeric urethane. Urethane has been found to be more impervious to petroleum-based solvents and maintains it elasticity much better over extended periods of use.

The suspension may include a single member, or multiple members which may all be the same, or may include different types of members.

Figure 11A:
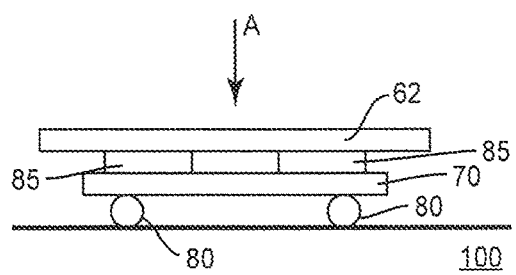
FIGS. 11A-11B are schematic side views of resilient spacers absorbing forces applied to a device.
Figure 11B:
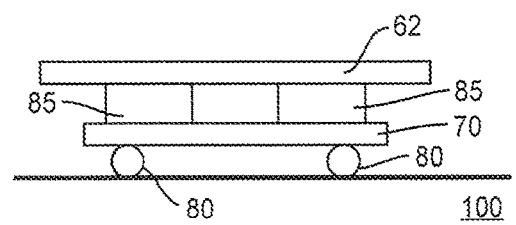

FIGS. 11A and 11B illustrate one example of the external suspension absorbing a force when the device 10 is dropped onto the ground 100. Examples of when this may occur include during delivery by an aircraft and being dropped while still a short distance above the ground 100, and during delivery in which the device 10 is set down rapidly onto the ground. For purposes of simplicity, just the floor 62, resilient spacers 85, base 70, and wheels 80 are illustrated.

As illustrated in FIG. 11A, the spacers 85 compress to absorb the forces when the device 10 is dropped in the direction of arrow A. In this embodiment, the device 10 lands evenly on the ground 100 and the amount of deformation is equal about the resilient spacers 85. The resilient spacers 85 maintain the floor 62 spaced away from the base 70. After the force is absorbed, the resilient spacers 85 return towards their original shape and size as illustrated in FIG. 11B.

Figure 12:
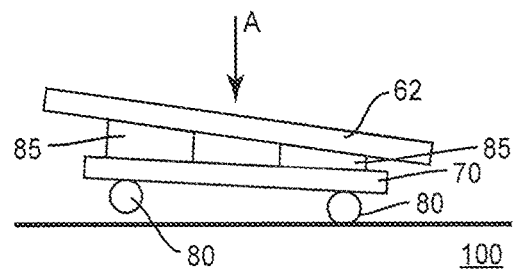
FIG. 12 is a schematic side view of a resilient spacers absorbing forces applied to a device.

FIG. 12 illustrates an embodiment in which the device 10 is dropped unevenly such that the first side contacts the ground 100 prior to the second side. The resilient spacers 85 on the first side deforms and begins to absorb the force upon contact with the ground 100 and prior to contact with the second side.

As illustrated in these Figures, the resilient spacers 85 support the frame 60 above the base 70 and allows for the frame 60 to move relative to the base 70.

Resilient spacer 85 may also be positioned at other locations on the device 10. As illustrated FIG. 8, resilient spacers 85 may be positioned below one or more of the energy storage device 57 and the processing circuit 51. Resilient spacers 85 may also be positioned on various sides of the components for additional protection. The resilient spacers 85 protect these components against forces that may be exerted on the device 10.

In use, the tanks 20 may be filled with the desired amount of fuel. The control circuit 50 may distribute the fuel during or after the fueling to distribute the weight load as necessary. Once filled, the device 10 is ready for delivery to a remote location. For air delivery, a hook, D-ring, or other like component attached to a wire, cable, rope, or webbing from a helicopter is attached to the connector 66. Once attached, the device 10 can be lifted by an aircraft, such as a helicopter (the device 10 may also be retrieved by a helicopter in a similar manner for delivery to a different location or refueling). The central location of the connector 66 and the even weight distribution of the fuel cause the device 10 to remain level once elevated above the ground. The device 10 is delivered to the desired location and detached from the aircraft. Once at the location, the device 10 may be rolled about as necessary, such as for storing in a hangar or other shielded location. Alternatively, the device 10 may remain exposed in the open with the casing 95 providing the necessary protection.

To dispense fuel, the device 10 is activated. This may include receiving a signal from a remote aircraft or air controller, or direct input through the input device 59. Once activated, the fuel is dispensed from the master tank 20a fuel tank port 27 through the portable electric transfer pump and nozzle system. The control circuit 50 monitors the amount of fuel being dispensed and the amount of fuel remaining with each of the tanks 20. The control circuit 50 may activate the fuel distribution system to move the fuel between the tanks 20 as necessary to supply enough fuel to the user and also to keep the weight evenly distributed about the device 10. Once the fueling process is complete, the device 10 is deactivated and returned to a waiting state for the next dispensing.

The control circuit 50 may periodically monitor the amount of remaining fuel in each of the tanks 20. Control circuit 50 may use sensor readings to determine the fuel amounts. Control circuit 50 may periodically transmit this information to a remote location. Alternatively, the control circuit 50 may transmit the information just when requested.

The control circuit 50 may also periodically monitor the quality of the fuel in the tanks 20. The control circuit 50 may turn on and off a fuel polishing system which removes harmful or detrimental substances which may accumulate in the fuel after extended periods of deployment in the field. The fuel polishing system may draw fuel in via a pump connected to a fitting located on the distribution manifold, filter, treat, and remove any particulates or accumulated moisture in the fuel and recirculate the polished fuel to the tanks 20.

FIG. 13 illustrates a device 10 with the casing 95 extending around the tanks 20 and all or majority of the frame 60. FIG. 13 includes the casing 95 having sharp corners, although casing 95 may also include more rounded corners.

The control circuit 50 may also monitor the temperature of the interior of the tanks 20 or the interior of the casing 95. The control circuit 50 may be configured to periodically transmit this information. Control circuit 50 may also be configured to transmit this information just when it deviates above or below predetermined high and low temperatures. Heating and/or cooling units may be associated with the device 10 and operated by the control circuit 50. In the event the temperature is above or below the settings, the control circuit 50 may activate the various temperature units to regulate the temperatures.

The device 10 may also be configured to hold other types of liquids, including but not limited to chemicals, fuels, and water. Specific fuels include but are not limited to kerosene, diesel, and various jet propellants such as JP-8, JP-4, JP-5, and Jet A-1.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A storage device to store and dispense fuel, the storage device comprising:
    a frame that includes a floor with a first side and an opposing second side, the frame also including a central column that extends upward above the first side of the floor;
    a base mounted to the frame below the floor;
    wheels mounted to the base;
    storage tanks comprising a master storage tank and slave storage tanks positioned on the first side of the floor and extending around the central column, the master and slave storage tanks being spaced apart with an overall weight of the master and slave storage tanks when full of fuel being evenly distributed across the frame;
    one or more conduits extending between the master storage tank and the slave storage tanks to move the fuel from the slave storage tanks to the master storage tank; and
    a suspension comprising resilient spacers positioned between the frame and the base to provide relative motion between the base and the frame, the suspension also comprising resilient spacers positioned between the master and slave storage tanks and the frame to provide relative motion between the master and slave storage tanks and the frame; and
    a processing circuit positioned within an interior of the central column to control the movement of fuel between the master and slave storage tanks.

2. The storage device of claim 1, wherein the resilient spacers positioned between the frame and the base are different than the resilient spacers positioned between the frame and the master and slave storage tanks.

3. The storage device of claim 1, further comprising an exterior casing mounted to the frame and that forms an enclosed interior space over the floor with the master and slave storage tanks positioned within the interior space.

4. A storage device to store and dispense fuel, the storage device comprising:
    a frame with a floor and a column that extends outward above the floor;
    a wheeled base mounted to the frame and positioned below the floor;
    storage tanks positioned on the floor and positioned to extend around the column, each of the storage tanks configured to contain fuel;
    one or more conduits extending between the storage tanks to move the fuel between the storage tanks;
    a retainer mounted to the column and including arms that extend radially outward from the column that are each connected to one of the storage tanks to secure the storage tanks, the retainer being axially spaced along the column above the floor to connect to an upper portion of the storage tanks;
    a suspension comprising resilient spacers positioned between the frame and the base to provide relative motion between the frame and the base, the suspension also comprising resilient spacers positioned between the storage tanks and the frame to provide relative motion between the storage tanks and the frame; and
    a processing circuit positioned within an interior of the column to control the movement of fuel between the storage tanks.

5. The storage device of claim 4, wherein each of the resilient spacers positioned between the frame and the base and between the storage tanks and the frame being deformable between a first configuration when no external forces are acting on the storage tanks and a different second configuration when external forces are acting on the storage tanks.

6. The storage device of claim 4, wherein the resilient spacers positioned between the storage tanks and the frame are positioned between a bottom of the storage tanks and the floor of the frame.

7. The storage device of claim 6, wherein the resilient spacers between the storage tanks and the frame are positioned between the retainer and the column for the retainer to be movably connected to the column.

8. The storage device of claim 4, wherein each of the storage tanks are independently configured to contain the fuel.

9. The storage device of claim 8, wherein each of the storage tanks includes the same capacity.

10. The storage device of claim 4, wherein a distal end of the column is positioned a greater distance from the floor than each of the storage tanks.

11. The storage device of claim 4, further comprising an exterior casing attached to the frame and that forms an enclosed interior space over the floor with the storage tanks positioned within the interior space.

12. The storage device of claim 4, further comprising support arms that extend between the column and a sidewall of the frame, the support arms forming receptacles spaced around the column that are each sized to contain one of the storage tanks.

13. The storage device of claim 4, wherein the resilient spacers positioned between the frame and the base being separate from and spaced away from the resilient spacers positioned between the storage tanks and the frame.

14. A storage device to store and dispense fuel, the storage device comprising:
- a frame that includes a floor with a first side and an opposing second side, a sidewall positioned around the floor and that extends upward above the first side of the floor, and a column at a center of the frame that extends upward above the first side of the floor;
- a connector positioned at the end of the column;
- a base mounted below the floor;
- wheels mounted to the base;
- storage tanks comprising a master storage tank and slave storage tanks positioned on the first side of the floor and within the sidewall, the master and slave storage tanks being spaced apart along the floor with an overall weight of the master and slave storage tanks when full of fuel being evenly distributed across the floor, the master and slave storage tanks positioned below the connector;
- one or more conduits extending between the master storage tank and the slave storage tanks to move the fuel from the slave storage tanks to the master storage tank;
- one or more first resilient spacers positioned between the master and slave storage tanks and the frame to provide relative movement between the master and slave storage tanks and the frame;
- one or more second resilient spacers positioned between the frame and the base to provide relative movement between the frame and the base, the one or more second resilient spacers being separate from and spaced away from the one or more first resilient spacers;
- each of the first and second resilient spacers being deformable between a first configuration when no external forces are acting on the master and slave storage tanks and a different second configuration when external forces are acting on the master and slave storage tanks.

15. The storage device of claim 14, wherein a distal end of the column opposite from the floor is positioned above the master and slave storage tanks.

16. The storage device of claim 14, wherein the first and second resilient spacers are each constructed from an elastic material.

17. The storage device of claim 14, further comprising an exterior casing attached to the frame and that forms an enclosed interior space over the floor with the master and slave storage tanks positioned within the interior space.

18. The storage device of claim 17, wherein a distal end of the column extends outward from the exterior casing.

19. The storage device of claim 14, wherein the one or more conduits extend through the floor of the frame with a first section of the one or more conduits positioned on the first side of the floor and a second section positioned on the second side of the floor.

20. The storage device of claim 14, further comprising support arms that extend between the column and the sidewall, the support arms forming receptacles spaced around the column that are each sized to contain one of the master and slave storage tanks.

* * * * *